US012673399B2

(12) United States Patent
Tien et al.

(10) Patent No.: US 12,673,399 B2
(45) Date of Patent: Jul. 7, 2026

(54) BREAKER BAR

(71) Applicants: I-Mei Tien, Taichung City (TW); Chun-Sheng Ku, Taichung City (TW)

(72) Inventors: I-Mei Tien, Taichung City (TW); Chun-Sheng Ku, Taichung City (TW)

( * ) Notice: Subject to any disclaimer, the term of this patent is extended or adjusted under 35 U.S.C. 154(b) by 411 days.

(21) Appl. No.: 18/462,897

(22) Filed: Sep. 7, 2023

(65) Prior Publication Data

US 2024/0238949 A1 Jul. 18, 2024

(30) Foreign Application Priority Data

Jan. 16, 2023 (TW) ................................ 112101807

(51) Int. Cl.
*B25B 23/00* (2006.01)

(52) U.S. Cl.
CPC ................................ *B25B 23/0028* (2013.01)

(58) Field of Classification Search
None
See application file for complete search history.

(56) References Cited

U.S. PATENT DOCUMENTS 6,295,898 B1 * 10/2001 Hsieh .................... B25G 1/063 81/177.8
6,857,341 B1 * 2/2005 Cheng .................... B25G 1/063 81/177.8
7,743,685 B2 * 6/2010 Chang .................... B25B 13/461 81/177.8
11,685,024 B2 * 6/2023 Chang .................... B25B 23/0028 81/176.1
2022/0080564 A1 * 3/2022 Hsieh .................... B25B 13/461

FOREIGN PATENT DOCUMENTS

TW I745140 B 11/2021

OTHER PUBLICATIONS

Search Report appended to an Office Action, which was issued to Taiwanese counterpart application No. 112101807 by the TIPO on Jan. 19, 2024, with an English translation thereof.

* cited by examiner

*Primary Examiner* — Brian D Keller
*Assistant Examiner* — John Michael Larson
(74) *Attorney, Agent, or Firm* — Burris Law, PLLC

(57) ABSTRACT

A breaker bar includes a mounting seat that has two support arms extending from a base portion thereof. The base portion and the support arms define a mounting space. The base portion has a first engaging section disposed between the support arms. Each support arm has a piercing. A connector has a head body and a second engaging section. The head body is rotatably disposed between the support arms in the mounting space. The second engaging section is connected to the head body, and is in contact with and rotatable relative to the first engaging section. A fastening member extends through the piercings of the support arms and the through hole, and fastens the connector head to the mounting seat.

7 Claims, 10 Drawing Sheets

BREAKER BAR

CROSS-REFERENCE TO RELATED APPLICATION

This application claims priority to Taiwanese Patent Application No. 112101807, filed on Jan. 16, 2023.

FIELD

The disclosure relates to a handheld tool, and more particularly to a breaker bar.

BACKGROUND

Due to rain and dust, bolts on a wheel may rust, thereby requiring a special hand tool, such as an F-type breaker bar that is used with a socket in order to remove the bolts from the wheel.

As shown in FIGS. 1 and 2, an existing F-type breaker bar includes an elongated rod 11 and a connector member 12 that is pivotally connected to a front end of the elongated rod 11 and that is rotatable relative to the elongated rod 11. The elongated rod 11 has two spaced-apart support arms 111 that extend from the front end of the elongated rod 11. The connector member 12 is disposed between and pivotally connected to the support arms 111 by a fastener 13.

When the existing F-type breaker bar is used to remove a bolt (not shown), stress concentration may result in material failure and cause breakage of components of the existing F-type breaker bar. During the removal of the bolt (not shown) using the existing F-type breaker bar, stress may be generated on a junction (A) of each support arm 111 and the connector member 12 and on a junction (B) of the fastener 13 and the connector member 12. When any of the stresses greatly exceed the material yield strength of a corresponding one of the support arms 111 or the fastener 13, the corresponding support arm 111 or the fastener 13 may break, thereby resulting in damage to the existing F-type breaker bar which may not be repairable. There is still room for improvement.

SUMMARY

Therefore, an object of the disclosure is to provide a breaker bar that can distribute stress and that can avoid stress concentration.

According to the disclosure, a breaker bar include a rod unit, a connector member, and a fastening set.

The rod unit includes a rod and a mounting seat. The mounting seat has a base portion connected to an end of the rod, and two spaced-apart support arms extending from the base portion. The base portion and the support arms cooperatively define a mounting space. The base portion has a first engaging section that is disposed between the support arms and that faces the mounting space. Each of the support arms has a piercing extending therethrough along an axial line.

The connector member is rotatably connected to the mounting seat, and has a connector head that has a head body and a second engaging section. The head body is disposed in the mounting space, is rotatable about the axial line, and has two outer surfaces that are respectively disposed adjacent to the support arms, and a through hole that extends through the outer surfaces in the axial line. The second engaging section is connected to the head body, and is direct contact with and rotatable relative to the first engaging section.

The fastening set includes a fastening member that extends in the axial line through the piercings of the support arms and the through hole of the head body and that fastens the connector head to the mounting seat.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
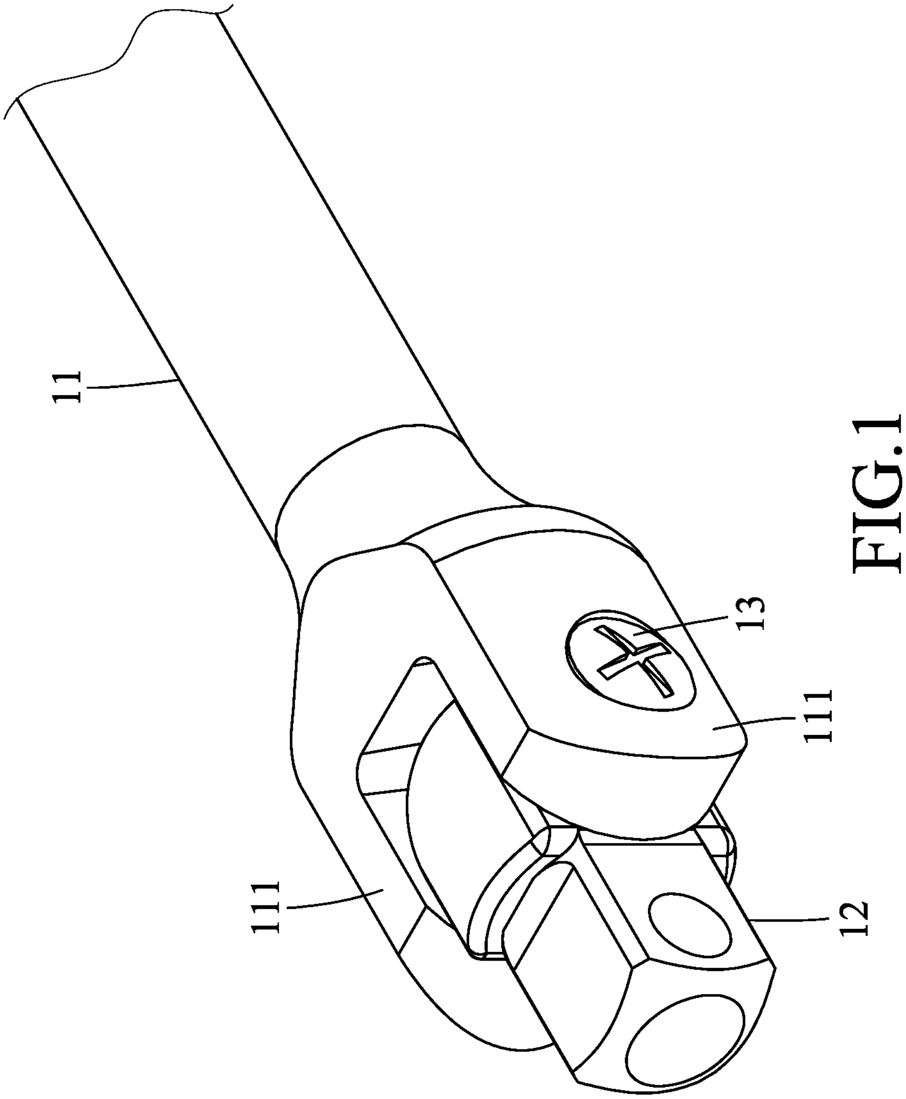
FIG.1 PRIOR ART
FIG. 1 is a fragmentary perspective view illustrating an existing F-type breaker bar.
Figure 2:
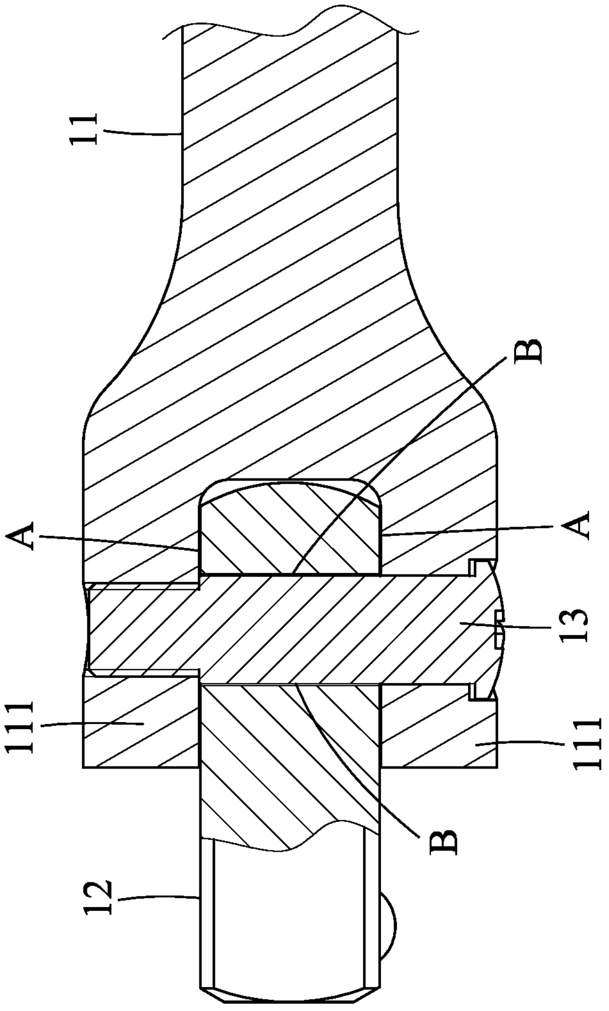
FIG.2 PRIOR ART
FIG. 2 is a partly fragmentary sectional view of a part of the F-type breaker bar.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
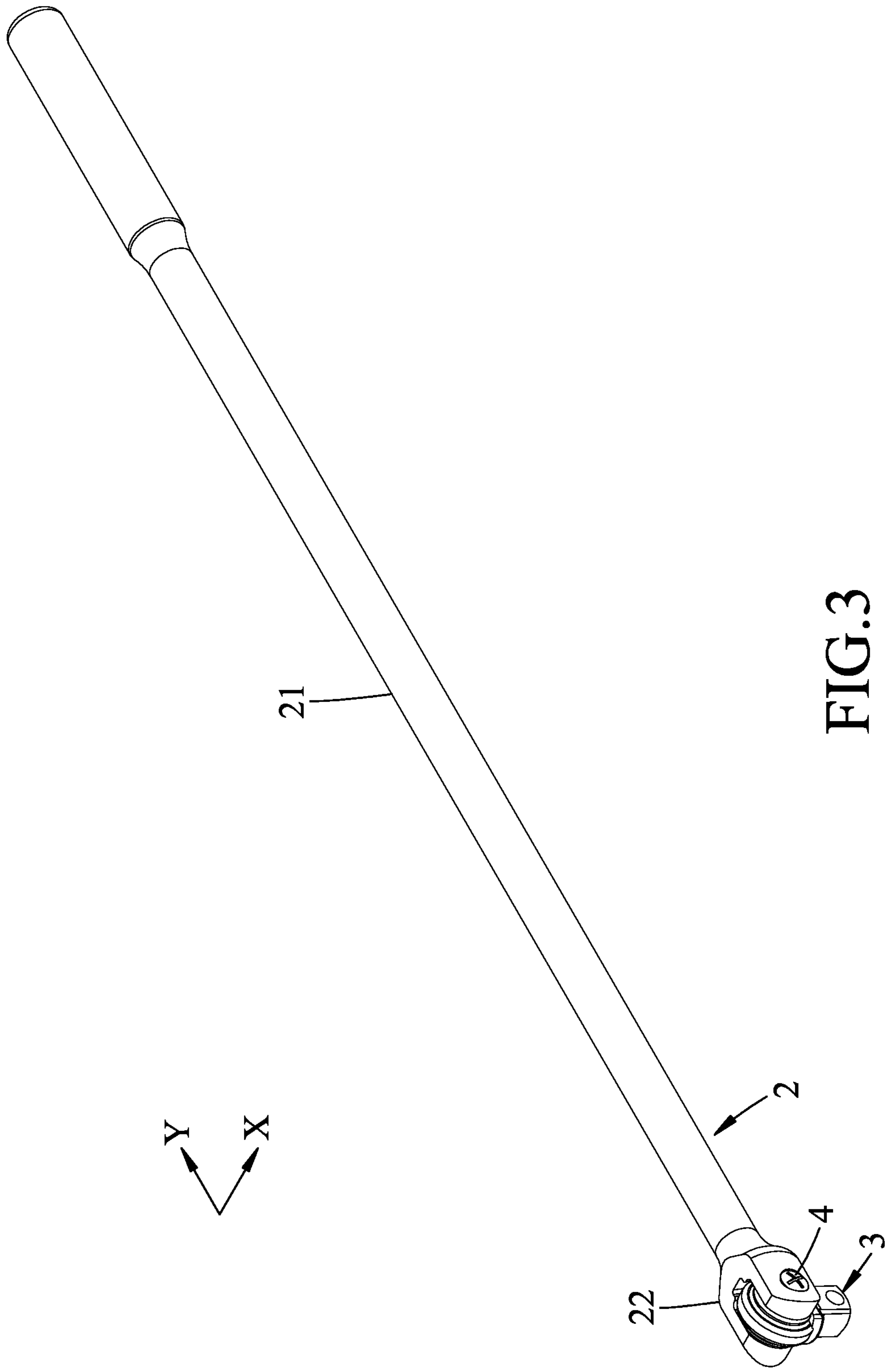
FIG. 3 is a perspective view illustrating a breaker bar according to an embodiment of the disclosure.
Figure 4:
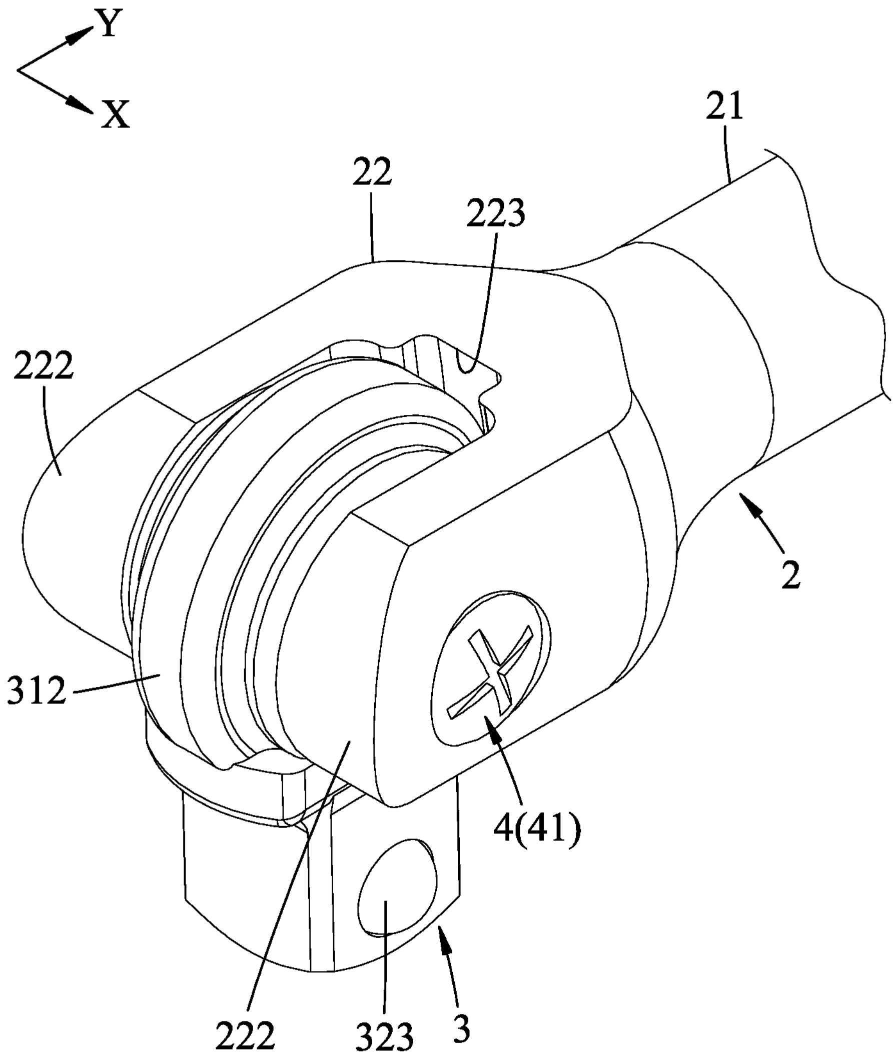
FIG. 4 is an enlarged fragmentary perspective view of the embodiment illustrating a part of the breaker bar.
Figure 5:
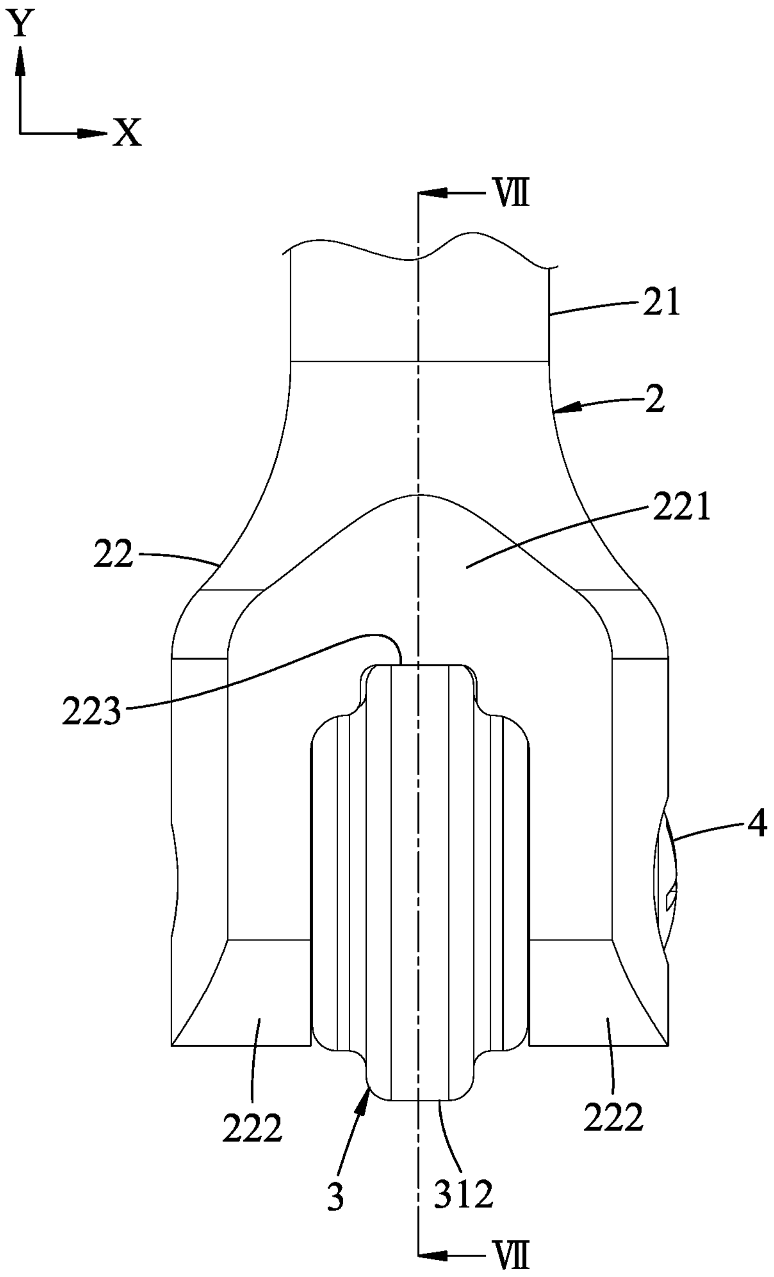
FIG. 5 is an enlarged fragmentary top view of the embodiment illustrating a part of the breaker bar.

FIGS. 3 to 5 illustrate a breaker bar according to an embodiment of the disclosure. The breaker bar includes a rod unit 2, a connector member 3, and a fastening set 4. In this embodiment, the breaker bar is an F-type breaker bar. However, the breaker bar of the disclosure is not limited thereto.

The rod unit 2 can be connected to a lever to lengthen a force arm relative to the breaker bar of the disclosure. The rod unit 2 includes a rod 21 and a mounting seat 22 that is integrally connected to the rod 21.

As shown in FIG. 3, the rod 21 extends in length along a longitudinal direction (Y).

Figure 6:
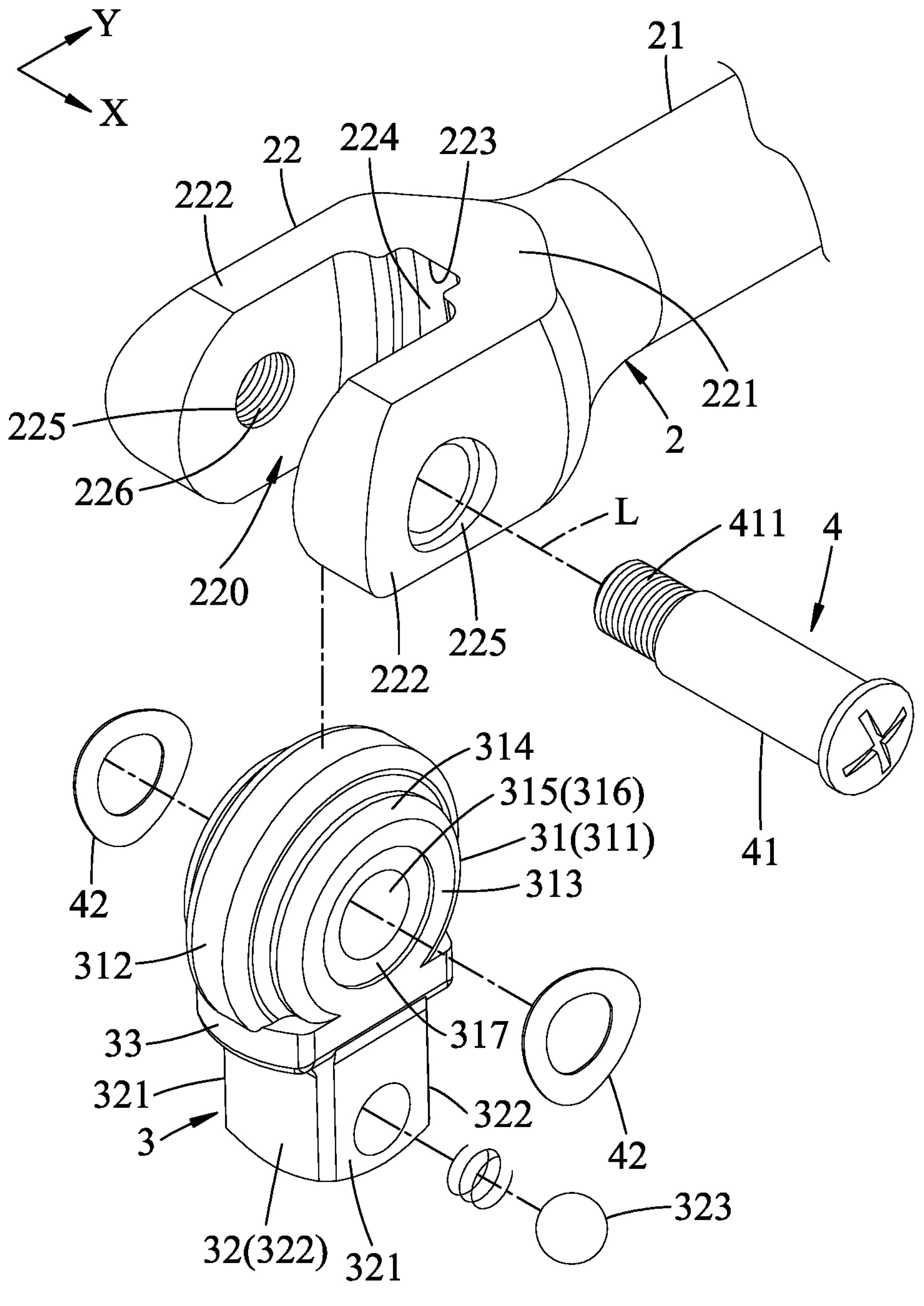
FIG. 6 a fragmentary exploded perspective of the embodiment illustrating a rod unit, a connector member, and a fastening set of the breaker bar.
Figure 7:
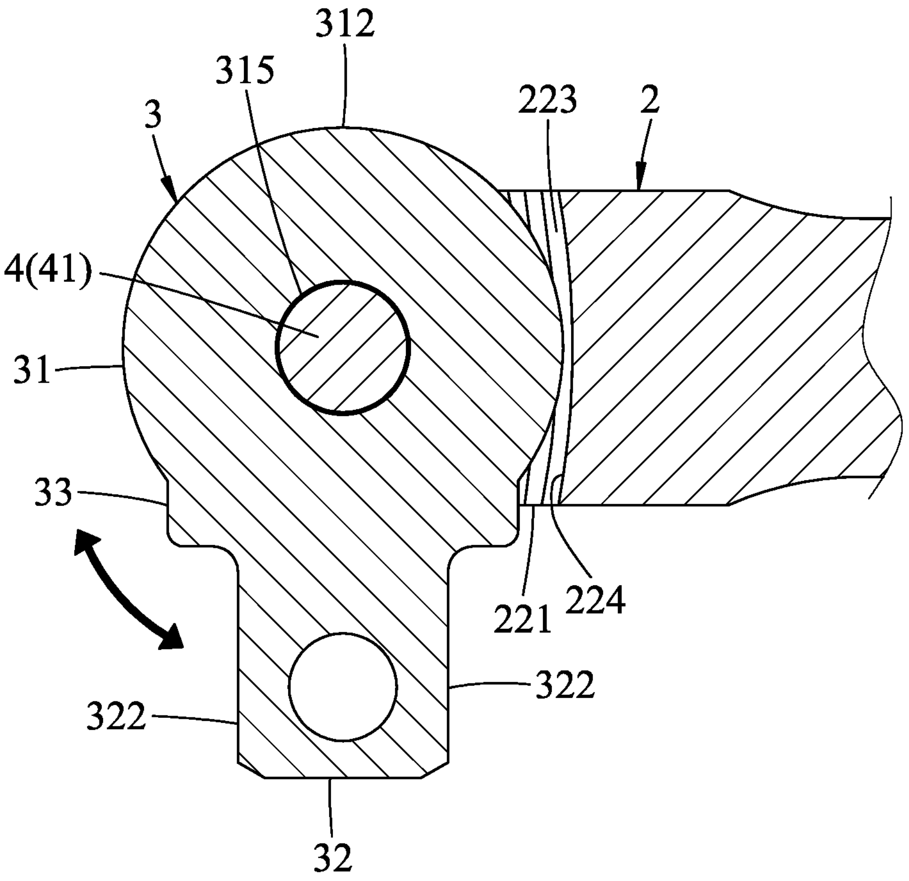
FIG. 7 is a fragmentary side sectional view taken along line VII-VII from FIG. 5 and illustrating the rod unit, the connector member, and the fastening set.

Referring to FIGS. 5 to 7, a mounting seat 22 has a base portion 221 and two-spaced apart arms 222. The base portion 221 is connected to an end of the rod 21. The support arms 222 extend from the base portion 221 and are spaced apart from each other in a first direction (X) perpendicular to the longitudinal direction (Y). The base portion 221 and the support arms 222 cooperatively define a mounting space 220. The base portion 221 has a first engaging section 223 that is disposed between the support arms 222 and that faces the mounting space 220. In this embodiment, the first engaging section 223 defines a recess. The base portion 221 of the mounting seat 22 includes an arc surface 224 that extends curvedly, that faces the mounting space 220, and that bounds the recess defined by the first engaging section 223. Each of the support arms 222 has a piercing 225 extending therethrough along an axial line (L) parallel with the first direction (X). One of the support arms 222 further has an internal thread 226 formed in the piercing 225. The piercing 225 of the other support arm 222 is a stepwise hole. In other variants, the base portion 221 of the mounting seat 22 may include a flat surface instead of the arc surface 224 that bounds the recess of the first engaging section 223.

The connector member 3 is rotatably connected to the mounting seat 22, and has a connector head 31, a drive head 32, and a shoulder 33.

Figure 8:
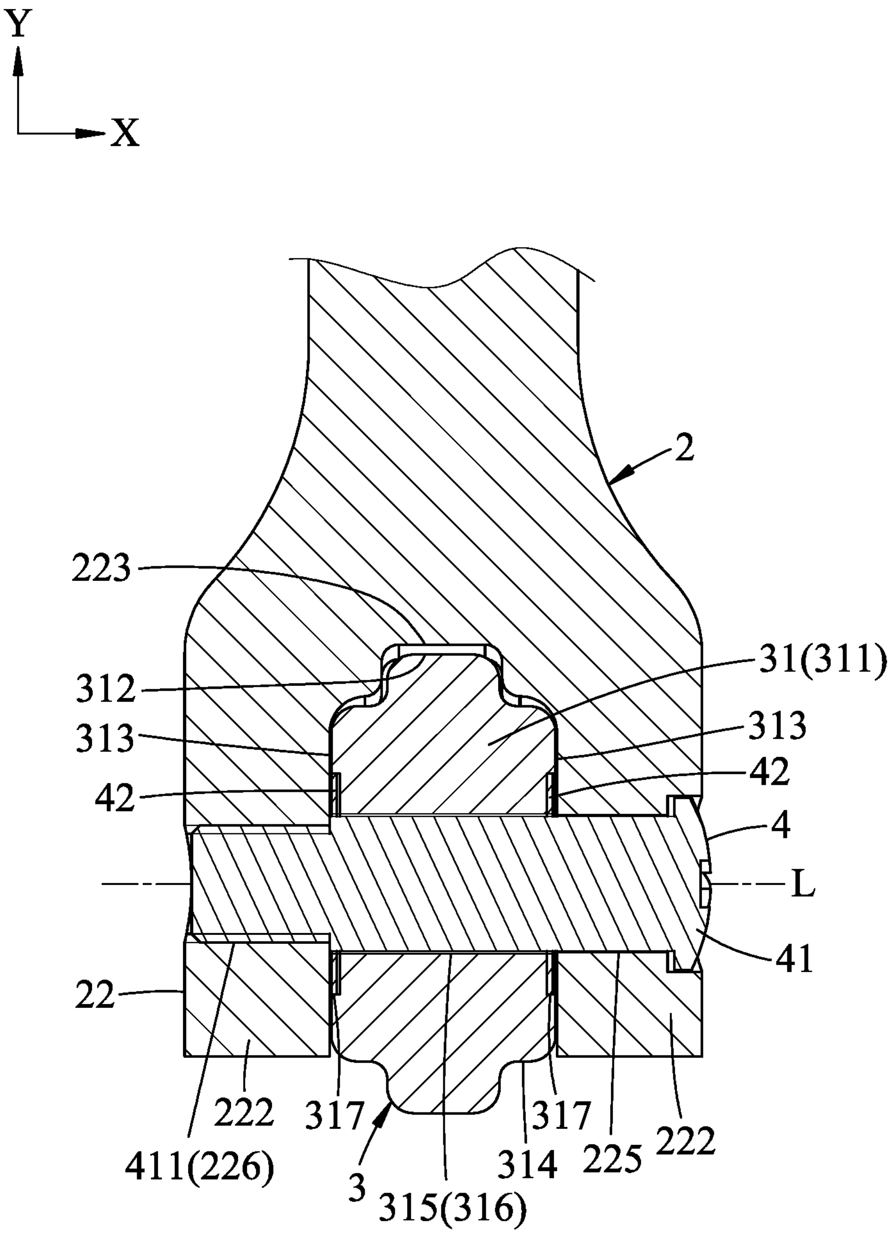
FIG. 8 is a fragmentary top sectional view of the embodiment illustrating the rod unit, the connector member, and the fastening set.

Referring to FIGS. 6 to 8, the connector head 31 has a head body 311 and a second engaging section 312. The head body 311 is disposed in the mounting space 220 and is rotatable about the axial line (L). The head body 311 has two outer surfaces 313, a surrounding surface 314, and a through hole 315. The outer surfaces 313 are respectively disposed adjacent to the support arms 222. The surrounding surface 314 is connected between the outer surfaces 313 in a curved manner. The through hole 315 extends through the outer surfaces 313 in the axial line (L). The through hole 315 has a first hole segment 316 and two second hole segments 317. The first hole segment 316 is disposed around the axial line (L). The second hole segments 317 are respectively formed in the outer surfaces 313 around the axial line (L) and communicate with the first hole segment 316. A diameter of the first hole segment 316 is smaller than that of each of the second hole segment 317.

The second engaging section 312 of the connector head 31 is curved and extends outwardly around the head body 311, and is in direct contact with and rotatable relative to the first engaging section 223. In this embodiment, the second engaging section 312 is a protrusion that extends curvedly and outwardly from the surrounding surface 314 of the head body 311. The second engaging section 312 is concentric with a curvature radius of the surrounding surface 314 so that a direct contact area between the first engaging section 223 and the second engaging section 312 remains constant during rotation of the connector head 31 relative to the mounting seat 22. The arc surface 224 faces the second engaging section 312. A curvature radius of the arc surface 224 is greater than that of the second engaging section 312. However, in other variant embodiments, a configuration of the second engaging section 312 may vary as long as the second engaging section 312 is rotatably in direct contact with the first engaging section 223.

The drive head 32 is disposed opposite to the connector head 31, and has two first drive surfaces 321 and two second drive surfaces 322. The first drive surfaces 321 are spaced apart from each other in the first direction (X). The second drive surface 322 are spaced apart from each other in the longitudinal direction (Y). Each of the second drive surfaces 322 is connected between the first drive surfaces 321. The drive head 32 is configured to be connected to a tool head (not shown), including but not limited to a socket. The drive head 32 is in a rectangular form. One of the first drive surfaces 321 is provided with an engaging ball 323 to lock the tool head.

The shoulder 33 integrally interconnects the connector head 31 and the drive head 32. As shown in FIG. 7, when the shoulder 33 is rotated with the connector member 3 and abuts against the base portion 221 of the mounting seat 22, further rotation of the connector member 3 is limited by abutment of the shoulder 33 against the base portion 221.

Figure 9:
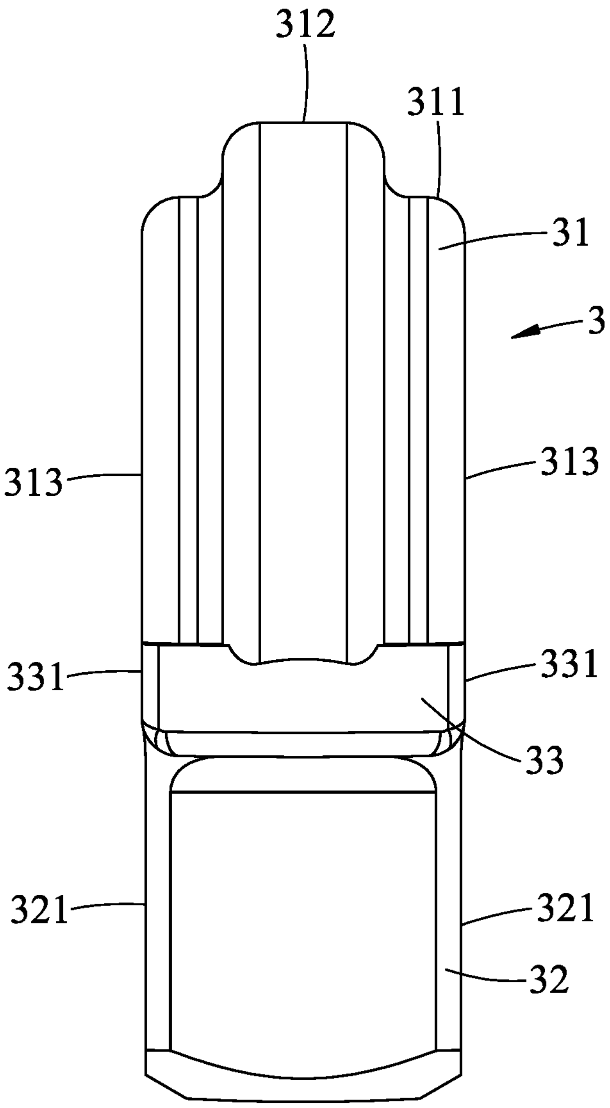
FIG. 9 is a front view of the embodiment illustrating the breaker bar.

Referring to FIG. 9, the shoulder 33 has two lateral surfaces 331 that are respectively connected to and coplanar with the outer surfaces 313 of the head body 311. A distance between the first drive surfaces 321 is slightly smaller than a distance between the lateral surfaces 331 and a distance between the outer surfaces 313.

Figure 10:
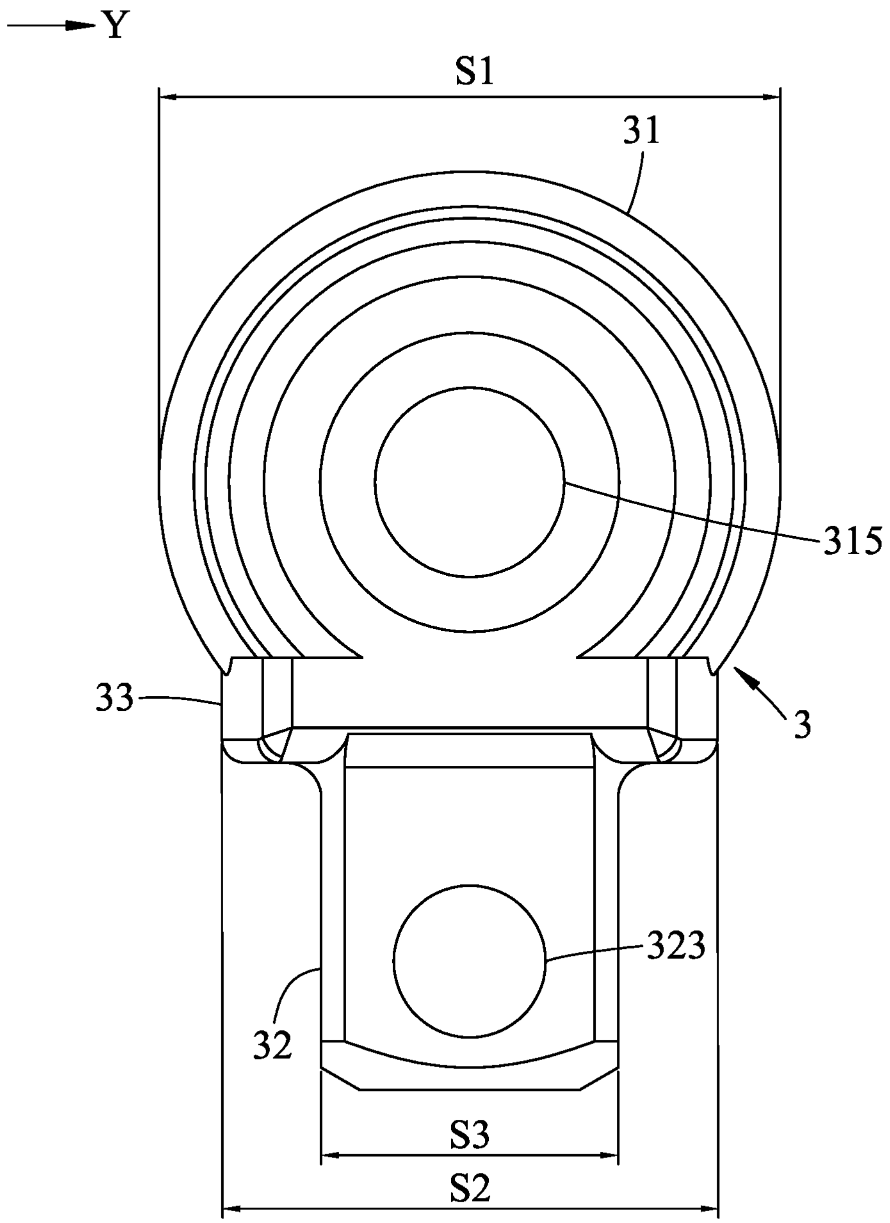
FIG. 10 is a side view of the embodiment illustrating the connector member.

Referring to FIG. 10, the connector head 31 has a maximum length (S1) in a longitudinal direction (Y). The shoulder 33 has a maximum length (S2) in the longitudinal direction (Y) that is greater than a maximum length (S3) of the drive head 32 in the longitudinal direction (Y) and that is smaller than the maximum length (S1) of the connector head 31.

Referring back to FIGS. 6 to 8, the fastening set 4 includes a fastening member 41 and two resilient members 42. The fastening member 41 extends in the axial line (L) through the piercings 225 of the support arms 222 and the through hole 315 of the head body 311, and fastens the connector head 31 to the mounting seat 22. Each of the resilient members 42 is disposed between the connector head 31 and the mounting seat 22, and is sleeved on the fastening member 41. In this embodiment, the fastening member 41 has a threaded portion 411 threadedly connected to the internal thread 226 in the piercing 225 of the one of the support arms 222. Each of the resilient members 42 is a curved disc spring. The resilient members 42 are respectively disposed in the second hole segments 317 of the through hole 315 and respectively abut against the support arms 222. By virtue of the resilient members 42, resilient forces of the resilient members 42 generate a buffer effect between the connector member 3 and the mounting seat 22, and reduce a rotational speed of the connector member 3 relative to the mounting seat 22. In other variant embodiments, each of the resilient members 42 may be, including but not limited to, a wave washer or other equivalent component.

In use, the drive head 32 is connected to the tool head, and the tool head receives a bolt (not shown). To remove the bolt, the rod 21 is forced. During removal of the bolt, stresses generated by using the breaker bar of the disclosure are distributed to a junction of the first engaging section 223 and the second engaging section 312, a junction of the support arms 222 and the connector head 31, a junction of the fastening member 41 and the support arms 222, and a junction of the shoulder 33 and the base portion 221. By virtue of the direct contact between the first engaging section 223 of the mounting seat 23 and the second engaging section 312 of the connector member 3, stress acting on an area of each component of the breaker bar of the disclosure is reduced, thereby preventing breakage of the fastening member 41 or the support arms 222 and prolonging the service life of breaker bar.

It should be noted that, by virtue of the shoulder 33 interconnecting the connector head 31 and the drive head 32, when the shoulder 33 is moved to abut against the base portion 221, the stress acting on each component of the breaker bar is more effectively reduced to prolong the service life of breaker bar.

In some other variant embodiments, the first engaging section 223 of the mounting seat 22 can be a protrusion, and the second engaging section 312 of the connector head 31 can define a recess. By virtue of the direct contact between the first engaging section 223 and the second engaging section 312, stress acting on the fastening member 41 or the support arms 222 can also be effectively reduced to prevent breakage of the fastening member 41 or the support arms 222 so as to prolong the service life of breaker bar.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A breaker bar comprising:

a rod unit including a rod, and a mounting seat that has a base portion connected to an end of said rod, and two spaced-apart support arms extending from said base portion, said base portion and said support arms cooperatively defining a mounting space, said base portion having a first engaging section that is disposed between said support arms and that faces said mounting space, each of said support arms having a piercing extending therethrough along an axial line;

a connector member rotatably connected to said mounting seat, and having a connector head that has a head body disposed in said mounting space, rotatable about the axial line, and having two outer surfaces that are respectively disposed adjacent to said support arms, a through hole that extends through said outer surfaces in the axial line, and a surrounding surface connected between said outer surfaces, and a second engaging section connected to said head body, and being in direct contact with and rotatable relative to said first engaging section; and a fastening set including a fastening member that extends in the axial line through said piercings of said support arms and said through hole of said head body and that fastens said connector head to said mounting seat;

wherein said first engaging section of said mounting seat defines a recess;

wherein said second engaging section of said connector head is a protrusion that extends curvedly and outwardly from said surrounding surface into said recess; and wherein said second engaging section is concentric with said surrounding surface.

2. The breaker bar as claimed in claim 1, wherein said base portion of said mounting seat includes an arc surface that extends curvedly and that bounds said recess defined by said first engaging section.

3. The breaker bar as claimed in claim 1, wherein said second engaging section of said connector head is curved and extends outwardly around said head body.

4. The breaker bar as claimed in claim 1, wherein:

said connector member further has a drive head that is disposed opposite to said connector head, and a shoulder that interconnects said connector head and said drive head;

said connector head has a maximum length in a longitudinal direction along which said rod extends; and said shoulder has a maximum length in the longitudinal direction that is greater than a maximum length of said drive head in the longitudinal direction and that is smaller than said maximum length of said connector head.

5. The breaker bar as claimed in claim 4, wherein said shoulder has two lateral surfaces that are respectively coplanar with said outer surfaces of said head body.

6. The breaker bar as claimed in claim 1, wherein said fastening set further includes at least one resilient member that is disposed between said connector head and said mounting seat and that is sleeved on said fastening member.

7. The breaker bar as claimed in claim 1, wherein:

one of said support arms further has an internal thread formed in said piercing; and said fastening member has a threaded portion threadedly connected to said internal thread.

* * * * *